Patented Mar. 7, 1950

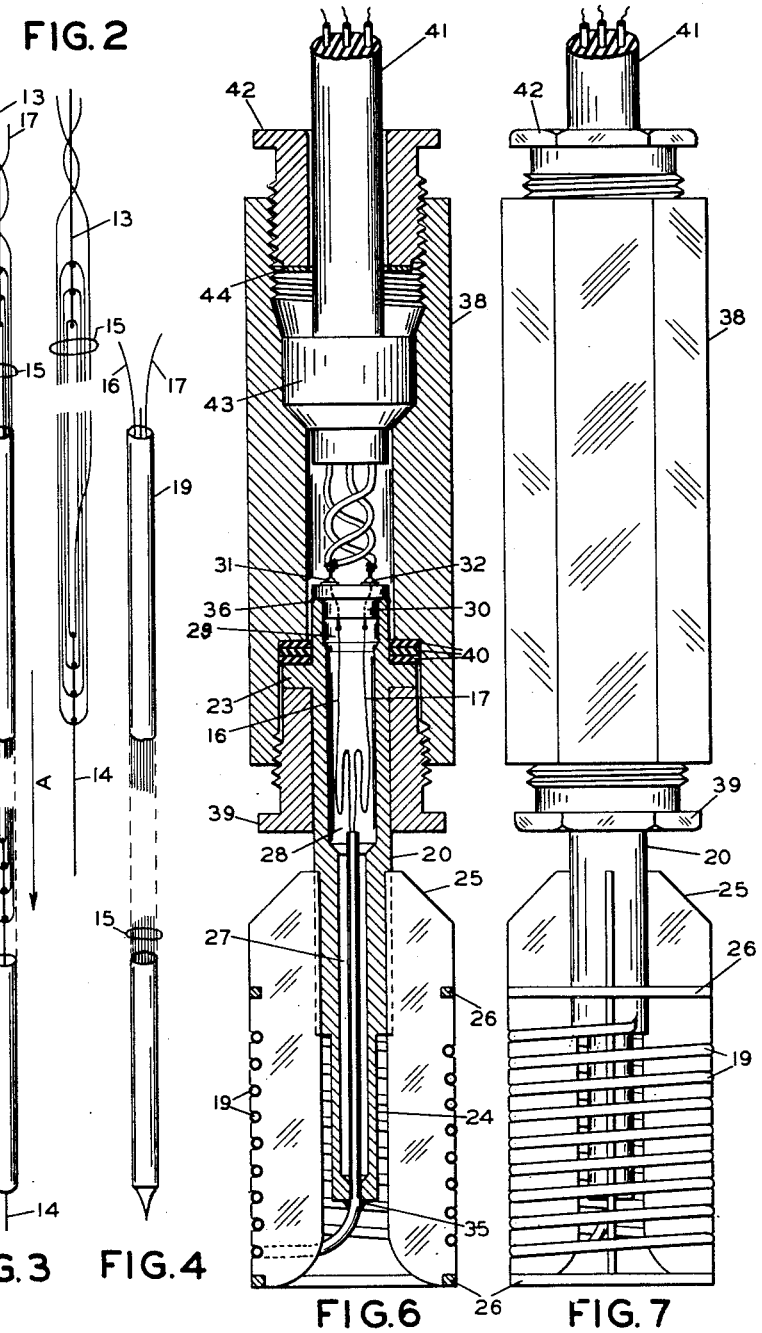

2,499,575

UNITED STATES PATENT OFFICE 2,499,575

SUBMERSIBLE ELECTRICAL RESISTANCE THERMOMETER

William Barton Eddison, Ardsley-on-Hudson, N. Y., and Abraham Walter Jacobson, New Haven, Conn., assignors to The Bristol Company, Waterbury, Conn., a corporation of Connecticut Application July 15, 1947, Serial No. 761,074

14 Claims. (Cl. 201—63)

1

This invention relates to electrical resistance thermometry, and more especially to a temperature-sensitive resistance unit characterized by a rapid response to changes in measured temperature, and by immunity from injury upon immersion in great depths of sea water. In the determination of sea water temperatures, it is customary to make use of a temperature-sensitive electrical resistance unit adapted to complete immersion in the body of water whose temperature is to be determined, and by means of a suitable waterproof flexible cable, electrically connected to circuits in an instrument, to provide an indication or a record of the resistance values attained by said unit, and therefore of the temperatures to which the same may be exposed. It will be understood that where such measurements are conducted at great depths, the sensitive unit may be subjected to tremendous pressures; and, since it is sometimes required to carry out such measurements at depths as great as 4,000 feet, the unit must be capable of withstanding, without leakage or appreciable distortion, hydrostatic pressures of the order of 2,000 pounds per square inch. Furthermore, since the practice of bathythermometry demands precise measurement of sharp, though slight temperature gradients which may be encountered in the course of movement of the measuring unit between differing strata of water, it is essential that the sensitive element be characterized by a relatively high rate of response to such temperature variations.

It is an object of the present invention to provide a temperature-sensitive resistance unit adapted to the purposes of electrical thermometry, and capable of withstanding immersion in great depths of water without distortion or leakage.

It is a further object to provide a unit of the above class which shall be characterized by a relatively high rate of response to changes in the temperature to which it is exposed.

It is a further object to provide a unit of the above class which shall be relatively inexpensive in construction, readily adjustable, and easily duplicated with respect to its performance characteristics.

In carrying out the purposes of the invention, it is proposed to provide a unit comprising a slender flexible metallic tube, containing a number of strands of temperature-sensitive resistance wire loosely positioned therein and forming a continuous conductor, the terminals of said conductor being brought to the exterior of the tube through waterproof terminals for connection to an exterior circuit, said tube being sealed to preclude the entry of moisture, and preferably coiled on a suitable supporting member.

In the drawings:

Figs. 1, 2, 3, and 4 represent various steps in a preferred method of constructing a resistance unit embodying the principles of the invention.

Fig. 5 is a sectional view to a greatly enlarged scale of the sensitive element of the thermometer.

Figs. 6 and 7 are a sectional view and a side elevation respectively of a complete thermometer element embodying the principles of the invention.

Referring now to the drawings:

The first step in the construction of a temperature-sensitive element embodying the principles of the invention is shown in Fig. 1. Near the extremities of an extended wooden board 10, or equivalent assembly base, are fixed in linear relationship two groups 11 and 12 of smooth pegs adapted to provide temporary supports for individual strands of temperature-sensitive resistance wire to be looped thereabout. With an assembly of eight strands, as has been found well suited to certain forms of the invention, the group 11 (indicated in the drawing as at the upper extremity of the mounting base) will comprise three, and the group 12, four, pegs. While specific dimensions will of course vary with designs suited to different applications, the following may be considered as typical, and will be taken as standard for the purposes of the present specification:

Resistance wire: commercially pure nickel, 0.0025" diameter, enamel insulated.

Mean spacing of groups of pegs: approximately 36".

Eight strands of said wire, wound as indicated in Fig. 1, having a single loop about each peg, with extra length for adjustment and external connection, will provide a nominal resistance value of approximately 240 ohms at a temperature of 32° F., which value may readily be adjusted to an arbitrary standard of 220 ohms.

The resistance wire, after being looped about the pegs as indicated in Fig. 1, is transferred to fine cords or strong threads 13 and 14, as indicated in Fig. 2. The thread 13 is knotted or otherwise secured to the individual loops of wire on the respective pegs of the group 11 in such a manner that when the thread is pulled taut, the several loops may be slipped over the tops of the pegs without substantially altering their relative linear positions; and the thread 14 is similarly secured to the individual loops about the pegs in the group 12. The threads 13 and 14 may then be utilized for removing the wire bodily from the pegs, providing a skein 15, having terminal portions 16 and 17; and, so long as said threads are kept in tension, the individual strands of wire may be maintained in substantial parallelism without tangling or excessive twisting.

A flexible tube 19, preferably of metal having a high thermal conductivity, provides an enclosure for the hereinbefore-described skein of temperature-sensitive wire 15. A tubing eminently suited to the purpose is formed of copper, having outside and inside diameters of 0.100 inch and 0.065 inch respectively, giving a wall thickness of 0.0175 inch. A straight portion of said tubing having a clean bore and approximating 4 feet in length is selected, and is preferably (though not necessarily) coated internally with a film providing a smooth surface and a certain degree of electrical insulation. A suitable coating for the inner face of the tube may be selected from among the new class of polymeric materials known as silicones, some of which have physical properties comparable to conventional organic varnishes, resins and film-forming materials, but are characterized by the chemical structure in which silicon takes the place of carbon in certain portions of the molecule. The chemical nature and physical applications of some of the silicones are set forth in U. S. Letters-Patent No. 2,258,219, granted to E. G. Rochow, October 17, 1941. The manner of inserting the skein of resistance wire into the tube 19, and of adjusting the resistance value, will presently be set forth. It may here be pointed out, however, that, as indicated in the enlarged sectional representation shown in Fig. 5, the resistance wires will occupy but a very small part of the whole internal section of the tube. With a tube having an internal diameter of 0.065 inch, eight strands each having a diameter of 0.0025 inch, together with their enamel insulation, will occupy only approximately 1/60 of the available space. Not only does this proportioning facilitate assembly, but the random distribution of the several strands of wire in the relatively large tubular space assures what is probably a more intimate contact, and therefore a more rapid transfer of heat between the tube wall and the enclosed wires than would be the case were the wires to be cabled or to occupy an appreciably great proportion of the space within the tube.

The manner of mounting and completing the mechanical assembly of the tubular member 19 and its associated parts will be understood by reference to Figs. 6 and 7. Referring especially to the former, the numeral 20 designates an extended mounting base of generally cylindrical conformation formed of metal and adapted for attachment of the assembly comprising the tube 19 and its enclosed resistance wire. For purposes of description, the base 20 and associated members of the assembly may be described as having "upper" and "lower" parts, as shown in the drawings. The upper part of the base 20 is in the form of an extended cylinder being surrounded near its topmost extremity by a ring or collar 23 integral with the base and adapted for securing the same in a housing presently to be described. The lower part of the base terminates in a somewhat reduced section 24 extending for a distance approximating one third the length of the whole base. The base 20 is further provided with a plurality of axial grooves formed on its exterior surface, extending toward the reduced section, and adapted to have secured therein the edges of a corresponding number of radial fins or spreaders 25, which fins also extend axially downward some distance beyond the extremity of the reduced portion 24. The outer edges of the fins 25 are provided with notches disposed along a helix about the assembled fins, and of dimensions to accommodate the section of the tube 19. The upper and lower portions of the fin assembly may, if desired, be reinforced by solid metal rings 26, tending to maintain them in alignment and generally stiffen the assembly.

The cylindrical base 20 is bored throughout its length, the bore having several sections of diameters progressively increasing from its lower to its upper extremity. A short portion at the lower end is drilled to a diameter providing a close fit for the tube 19, wherein the latter may be secured and sealed as by soldering or brazing. Extending upward into the body of the base 20 for about half its length is a bored portion 27, approximating in diameter three times that of the tube 19, and adapted to accommodate the latter with ample clearance for manipulation. The upper half of the base 20 includes a portion 28 bored to a diameter considerably larger than that of the portion 27; and a short portion 29 at the upper extremity and above the collar 23 is bored to a still larger diameter, leaving a relatively thin wall between the inner and outer surfaces.

A metal cap 30 is formed with flat faces separated by two cylindrical portions of different diameters, a reduced portion adapted to fit within the bore 29 and an adjacent enlarged portion substantially the diameter of the main part of the base 20, and is provided with two hermetically sealed terminals 31 and 32, having conducting members electrically insulated from said cap and adapted to provide fluid-tight electrical connections passing through the same.

Assembly of the tube 19, containing the temperature-sensitive wire, to the base 20 is effected in the following manner: The upper extremity of the tube is inserted into the lower end of the base through the small opening provided, and is extended thereinto for a distance approximating the length of bored portion 27, where the tube is secured and sealed into the base by means of a soldered joint 35. While insulating coatings of the silicone class are not injured by the temperatures associated with soft-soldering, yet, if desired, the application of this coating to the internal surface of the tube 19 may be deferred until after assembly of the latter to the base 20.

With the tube 19 secured to the base 20, insertion of the skein of temperature-sensitive resistance wire into the former is effected in the following manner: The thread 14 is first passed through the length of the tube, and, as indicated in Fig. 3, this thread is used to pull the skein of the wire into the tube as indicated by the arrow A, the skein meanwhile being kept straight and free from kinks by maintaining suitable tension between the threads 13 and 14. The assembly of threads and wire is pulled into the tube 19 until the whole skein is enclosed in the tube, leaving the thread 13 and the two terminal portions 16 and 17 of the wire projecting from the upper extremity of the tube, within the base 20, while only the thread 14 will project from the lower extremity thereof. Tension between the threads 13 and 14 is now released, allowing the several strands of wire to distribute themselves loosely within the tube 19, being constrained however, into substantial parallelism by the walls of the tube.

The electrical circuit of the temperature-sensitive element is completed by soldering the extension portions of the resistance wire to the sealed terminals 31 and 32 respectively, at which time calibration of the element is also affected. The material of the wire having known temperature/resistivity characteristics, calibration consists in adjusting the resistance of each unit to a predetermined value at a standard reference temperature. This is carried out after insertion of the skein into the tube, the latter being maintained at the reference temperature, and the length of the active portion of the conductor adjusted until the desired value is obtained. The tube 19 being straight, and open at both ends, the skein of wire, by means of the threads 13 and 14, may readily be withdrawn from the tube as far as necessary to provide access to its extremities for adjustment, and subsequently retracted into the tube while resistance measurement is performed. When adjustment is complete, the thread 14 is cut off, or tucked into the open end of the tube 19, and that extremity hermetically sealed, as by the application of solder.

The reduced portion of the cap 30 is then inserted into the short enlarged bore 29, where it is secured and sealed by means of a soldered or brazed joint 36, thus completely isolating the interior of the base 20 and the tube 19 from fluid communication with exterior space. While not essential to operation of the device, the enclosed space within said base and tube may be filled with a gaseous medium; and this, if desired, may be adjusted to a suitable pressure to lessen the tendency toward leakage into the interior space of fluid under high external hydrostatic pressure or toward distortion of the element when subjected to such pressure. The extended "lower" portion of the tube 19 is coiled about the fins or spreaders 25 to lie in the notches on the edges of the same, wherein said tube may be secured by soldering, and forming a helix to provide a maximum area of interface between the tube and the fluid medium with which it may be surrounded.

The temperature-sensitive element, assembled as hereinbefore set forth, is mounted in a supporting member 38 comprising an elongated body formed preferably of metal, and fitted with suitable attachment means (not shown in the drawing) whereby the complete device may be either secured to other apparatus suited to submersion or suspended from a supporting cable. The body is bored through to a diameter slightly in excess of that of the part 20, and both ends are bored to a greater diameter and internally threaded to form stuffing boxes, that in the lower end being formed preferably with a flat bottom, and that in the upper end with a tapered bottom. The hereinbefore-described assembly of the temperature-sensitive element is provided with a gland 39 having a flat surface adapted to engage the collar 23 on the base 20 and threaded to fit the lower stuffing box in the member 38. In assembling the temperature-sensitive element to the member 38, several resilient washers 40 are interposed between the flat bottom of the lower stuffing box and the upper surface of the collar 23, whereupon, when the gland 39 is engaged with the threads in said stuffing box and tightened, there will be provided a mechanically strong and fluid-tight joint between the sensitive element and the supporting member 38.

Electrical connection between the sensitive element and the instrument by which its resistance is determined is made through the medium of an extended waterproof cable 41 having preferably three conductors, mutually insulated and protected against moisture by rubber or plastic coatings or the equivalent. The cable 41 is surrounded by a gland 42 having a flat base and threaded to fit the upper stuffing box in the member 38. Two of the conductors within the cable are connected to one, and the remaining conductor to the other, of the terminals 31—32, thereby providing for the conventional three-conductor circuit well known in the art as especially adapted to resistance thermometry. An assembly whereby the mechanical connection of the cable 41 to the submersible apparatus may be rendered waterproof under conditions of extreme hydrostatic pressure may be effected by serving the lower end of the cable near its extremity with layers of rubber tape to build up a cylindrical collar 43, substantially fitting the upper stuffing box in the member 38. Or the collar 43 may take the form of a molded element of rubber or equivalent resilient material, preferably flat on its upper surface and conically tapered on its lower surface, to engage the tapered bottom of the stuffing box. Upon the gland 42 being screwed into place upon the resilient collar 43, preferably with a metal washer 44 interposed, the collar will be compressed into the stuffing box, and, engaging the inner surface of the same, will tend to grip the cable 43 to form a waterproof and a mechanically secure connection.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

We claim:

1. A submersible temperature-sensitive resistance unit comprising a metallic tubular member hermetically sealed at one end, and a skein of insulated wire having a known temperature coefficient of resistivity and comprising a plurality of substantially parallel strands, lying freely within said tubular member, occupying a relatively small part of its internal sectional area and in thermal contact with its internal walls.

2. A submersible temperature-sensitive resistance unit comprising a metallic tubular member hermetically sealed at one end, and a skein of insulated wire having a known temperature coefficient of resistivity and comprising a plurality of substantially parallel and unstressed strands, lying freely within said tubular member and in thermal contact with its internal walls.

3. A submersible temperature-sensitive resistance unit comprising an extended metallic tubular member hermetically sealed at one end, a skein of insulated wire having a known temperature coefficient of resistivity and comprising a plurality of substantially parallel strands, lying freely within said tubular member, and in thermal contact with its internal walls, and means cooperating with said tubular member for sealing the terminal conductors of said skein and isolating the interior of said tubular member from external space.

4. A submersible temperature-sensitive resistance unit comprising an extended metallic tubular member hermetically sealed at one end, a skein of insulated wire having a known temperature coefficient of resistivity and comprising a plurality of substantially unstressed strands, lying freely within said tubular member, and in thermal contact with its interior walls and means cooperating with said tubular member for sealing of said skein and isolating the interior of said tubular member from external space.

5. A submersible temperature-sensitive resistance unit comprising an extended metallic tubular member hermetically sealed at one end, a skein of insulated wire having a known temperature coefficient of resistivity and comprising a plurality of substantially parallel unstressed strands, within said tubular member and in thermal contact with its internal walls, and means cooperating with said tubular member for sealing the terminal conductors of said skein and isolating the interior of said tubular member from external space.

6. A submersible temperature-sensitive resistance unit comprising a flexible metallic tubular member hermetically sealed at one end, and a skein of insulated wire having a known temperature coefficient of resistivity and comprising a plurality of substantially parallel strands, lying freely within said tubular member and in thermal contact with its internal walls, and supporting means having said tubular member wound thereon.

7. A submersible temperature-sensitive resistance unit comprising a flexible metallic tubular member hermetically sealed at one end, and a skein of insulated wire having a known temperature coefficient of resistivity and comprising a plurality of substantially parallel strands, lying freely within said tubular member and in thermal contact with its internal walls, and supporting means having an interior bore into which an end of said tubular member extends, said supporting means having an exterior portion around which said tubular member is wound.

8. A submersible temperature-sensitive resistance unit comprising a flexible metallic tubular member hermetically sealed at one end, and a skein of insulated wire having a known temperature coefficient of resistivity and comprising a plurality of substantially parallel strands, lying freely within said tubular member and in thermal contact with its internal walls, supporting means having an exterior portion around which said tubular member is wound, said supporting means also having an interior bore into which an end of said tubular member extends, and means for sealing the terminal conductors of said skein and isolating the interior of said tubular member from external space.

9. A submersible temperature-sensitive resistance unit comprising a flexible metallic tubular member hermetically sealed at one end, and a skein of insulated wire having a known temperature coefficient of resistivity and comprising a plurality of substantially parallel strands, lying freely within said tubular member, and in thermal contact with its internal walls, and supporting means for said tubular member comprising radially disposed fins having said tubular member wound thereon.

10. A submersible temperature-sensitive resistance unit comprising a flexible metallic tubular member hermetically sealed at one end, and a skein of insulated wire having a known temperature coefficient of resistivity and comprising a plurality of substantially parallel strands, lying freely within said tubular member and in thermal contact with its internal walls, and supporting means having an interior bore into which an end of said tubular member extends, said supporting means also having external fins around which said tubular member is wound.

11. A submersible temperature-sensitive resistance unit comprising a flexible metallic tubular member hermetically sealed at one end, and a skein of insulated wire having a known temperature coefficient of resistivity and comprising a plurality of substantially parallel strands lying freely within said tubular member, and in thermal contact with its internal walls, supporting means having said tubular member wound thereon, and pressure tight sealing means cooperating with said supporting means for protecting the terminal conductors of said skein from contact with liquid when said supporting means is immersed therein.

12. A submersible temperature-sensitive resistance unit comprising a flexible metallic tubular member hermetically sealed at one end, and a skein of insulated wire having a known temperature coefficient of resistivity and comprising a plurality of substantially parallel strands lying freely within said tubular member and in thermal contact with its internal walls, supporting means having said tubular member wound thereon, and means cooperating with said supporting means for sealing a waterproof electric cable thereto with its conductors connected to the terminal conductors of said skein.

13. A submersible temperature-sensitive resistance unit comprising a flexible metallic tubular member hermetically sealed at one end, and a skein of insulated wire having a known temperature coefficient of resistivity and comprising a plurality of substantially parallel strands lying freely within said tubular member and in thermal contact with its internal walls, supporting means having said tubular member wound thereon, means cooperating with said tubular member for sealing the terminal conductors of said skein and isolating the interior of said tubular member from external space, and means cooperating with said supporting means for sealing a waterproof cable thereto with its conductors connected to said terminal conductors.

14. A submersible temperature-sensitive resistance unit comprising a flexible metallic tubular member hermetically sealed at one end, and a skein of insulated wire having a known temperature coefficient of resistivity and comprising a plurality of substantially parallel strands lying freely within said tubular member and in thermal contact with its internal walls, supporting means having an exterior portion around which said tubular member is wound, said supporting means also having an interior bore into which an end of said tubular member extends, means cooperating with said supporting means for sealing the terminal conductors of said skein and isolating the interior of said tubular member from external space, and means cooperating with said supporting means for sealing a waterproof cable thereto with its conductors connected to said terminal conductors.

WILLIAM BARTON EDDISON.
ABRAHAM WALTER JACOBSON.

REFERENCES CITED

The following references are of record in the file of this patent:

UNITED STATES PATENTS

| Number | Name | Date |
|---|---|---|
| 1,110,602 | Thomas | Sept. 15, 1914 |
| 1,785,662 | Waterloo | Dec. 16, 1930 |
| 1,841,332 | Kranz | Jan. 12, 1932 |
| 2,379,530 | Lederer | July 3, 1945 |